(12) United States Patent
Izumichi

(10) Patent No.: US 9,988,232 B2
(45) Date of Patent: Jun. 5, 2018

(54) DAMPER MECHANISM OF TURNING MEMBER, RELAY CONVEYING UNIT, AND IMAGE FORMING APPARATUS

(71) Applicant: KYOCERA Document Solutions Inc., Osaka (JP)

(72) Inventor: Sachio Izumichi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 5 days.

(21) Appl. No.: 15/227,550

(22) Filed: Aug. 3, 2016

(65) Prior Publication Data

US 2017/0036877 A1 Feb. 9, 2017

(30) Foreign Application Priority Data

Aug. 5, 2015 (JP) ................... 2015-155368

(51) Int. Cl.
| | | |
|---|---|---|
| *B65H 29/52* | (2006.01) | |
| *G03G 15/00* | (2006.01) | |
| *F16H 19/04* | (2006.01) | |
| *G03G 21/16* | (2006.01) | |

(52) U.S. Cl.
CPC ............. *B65H 29/52* (2013.01); *F16H 19/04* (2013.01); *G03G 15/6529* (2013.01); *G03G 15/6552* (2013.01); *G03G 21/1638* (2013.01); *B65H 2402/10* (2013.01); *B65H 2402/45* (2013.01); *B65H 2403/61* (2013.01); *B65H 2404/611* (2013.01); *B65H 2601/11* (2013.01); *B65H 2801/27* (2013.01); *G03G 2215/00544* (2013.01)

(58) Field of Classification Search
CPC . B65H 2403/61; B65H 2402/45; F16H 55/26; F16H 19/04; G03G 21/1638
See application file for complete search history.

(56) References Cited

U.S. PATENT DOCUMENTS

| | | | | |
|---|---|---|---|---|
| 5,522,485 A | * | 6/1996 | Takahashi | F16F 9/12 188/290 |
| 8,042,660 B2 | * | 10/2011 | Cultraro | E05F 3/14 188/290 |
| 2011/0072925 A1 | * | 3/2011 | Ikeda | B60H 1/00664 74/412 R |

(Continued)

FOREIGN PATENT DOCUMENTS

JP 2006-083551 A 3/2006

*Primary Examiner* — Jeremy R Severson
(74) *Attorney, Agent, or Firm* — Studebaker & Brackett PC

(57) ABSTRACT

The damper mechanism includes a rack and a damper unit. The rack is provided in an apparatus main body. The damper unit is provided in a turning member. The damper unit has a movable gear, a fixed gear and a supporting member. The movable gear is configured to engage with the rack and to rotate by the turning of the turning member. The fixed gear is configured to be engaged with the movable gear and to apply a load to the rotation of the movable gear. The movable gear is supported by the supporting member so as to move relatively with respect to the fixed gear in a direction to be engaged with the fixed gear at the turning of the turning member in one direction and in another direction to be separated from the fixed gear at the turning of the turning member in the other direction.

10 Claims, 11 Drawing Sheets

REAR ← → FRONT

(56) References Cited

U.S. PATENT DOCUMENTS

2013/0112023 A1\* 5/2013 Tinnin .................. B60T 11/08
 74/422
2016/0018780 A1\* 1/2016 Sugiyama .......... G03G 21/1633
 399/110

\* cited by examiner

LEFT ←→ RIGHT

REAR ←——→ FRONT

REAR ←——→ FRONT

REAR ←→ FRONT

REAR ← → FRONT

DAMPER MECHANISM OF TURNING MEMBER, RELAY CONVEYING UNIT, AND IMAGE FORMING APPARATUS

INCORPORATION BY REFERENCE

This application is based on and claims the benefit of priority from Japanese Patent application No. 2015-155368 filed on Aug. 5, 2015, the entire contents of which are incorporated herein by reference.

BACKGROUND

The present disclosure relates to a damper mechanism of a turning member such as a cover, a relay conveying unit including the damper mechanism, and an image forming apparatus.

In a general image forming apparatus, an in-body sheet ejection space is provided between an upper image reading part and a lower image forming part. A sheet on which an image has been formed at the image forming part is ejected to a tray formed on a bottom face in the in-body sheet ejection space. In a case where a post-processing device to carry out a post-processing on the sheet is mounted to the image forming apparatus provided with such an in-body sheet ejection space, the post-processing device is attached to the outside of the in-body sheet ejection space, and a relay conveying unit provided with a conveying path along which the sheet on which an image is formed is conveyed to the post-processing device is installed in the in-body sheet feeding space.

In order to handle a sheet jam occurred in the conveying path, the relay conveying unit is provided with a front cover which is turnable around a lower end. By turning the front cover downward, the conveying path is thereby opened.

In the cover that is provided to be turnable about the lower end, such as this front cover, there are many cases in which, in order to impart comfortability and a high grade sense to the turning work, a damper mechanism is provided so as not to allow the cover to suddenly open.

As the damper mechanism, there may be a case in which a load supplying unit to apply a load to a turning shaft side end of the cover is provided. As the load supplying unit, an oil damper or a torque limiter is used.

SUMMARY

In accordance with an embodiment of the present disclosure, a damper mechanism of a turning member includes a rack and a damper unit. The turning member is provided in an apparatus main body so as to be turnable between a first position and a second position around at least one supporting shaft. The rack is provided in either one of the apparatus main body and the turning member. The rack is formed along an arch around the supporting shaft. The damper unit is provided in the other of the apparatus main body and the turning member. The damper unit has a movable gear, a fixed gear and a supporting member. The movable gear is configured to engage with the rack and to rotate by the turning of the turning member. The fixed gear is configured to be capable of engaging with the movable gear and to apply a load to the rotation of the movable gear. The supporting member is configured to support the fixed gear and the movable gear. The movable gear is supported so as to move relatively with respect to the fixed gear in a direction to be engaged with the fixed gear at the turning of the turning member in one direction from the first position to the second position and in another direction to be separated from the fixed gear at the turning of the turning member in the other direction from the second position to the first position.

In accordance with an embodiment of the present disclosure, a relay conveying unit includes an apparatus main body, an upper conveying guide, a lower conveying guide and the above damper mechanism. The relay conveying guide is disposed in an in-body sheet ejection space of an image forming apparatus. The relay conveying unit has a relay conveying path along which a sheet being formed an image is conveyed to a post-processing device. The apparatus main body is provided with the relay conveying path. The upper conveying guide is provided in the apparatus main body and forms an upper guiding surface of the relay conveying path. The lower conveying guide forms a lower guiding surface of the relay conveying path. The lower conveying guide is supported in the apparatus main body so as to be turnable in a vertical direction around its one end to form or open the relay conveying path. In the damper mechanism, the turning member is the lower conveying guide.

In accordance with an embodiment of the present disclosure, an image forming apparatus includes an image forming unit, a turning member and the above damper mechanism. The damper mechanism is configured to buffer the turning of the turning member.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, with reference to figures, an image forming apparatus and a relay conveying unit according to an embodiment of the present disclosure will be described.

Figure 1:
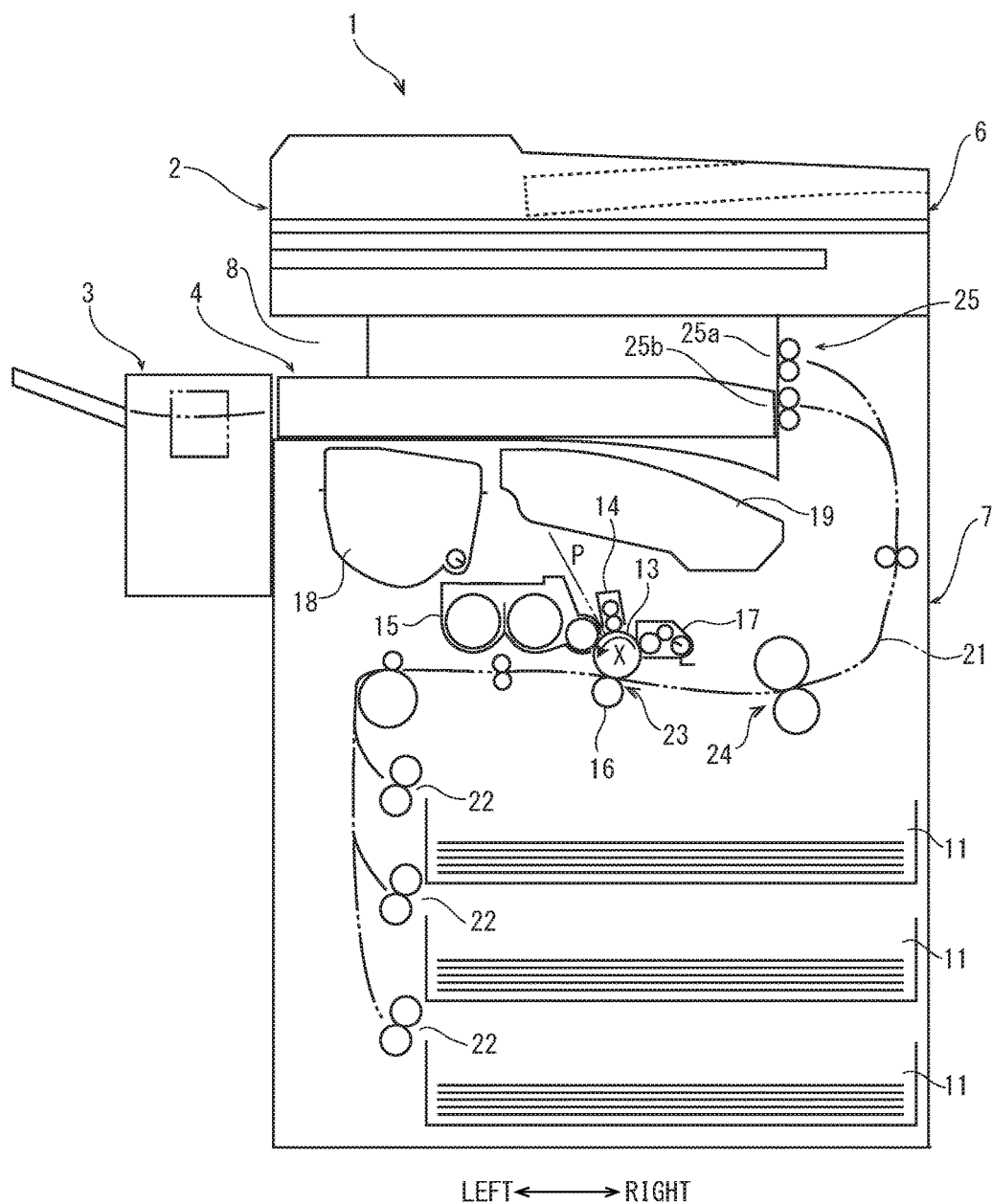
FIG. 1 is a schematic view showing an overview of a printer according to an embodiment of the present disclosure.

First, with reference to FIG. 1, an entire structure of a printer 1 as an image forming apparatus will be described. FIG. 1 is a perspective view schematically showing the printer. In the following description, a front side of FIG. 1 shows a front side of the printer, and left and right directions are based on a direction viewed the printer from the front side.

The printer 1 is provided with a printer main body 2 which performs an image forming processing. To the printer main body 2, a post-processing apparatus 3 and a relay conveying unit 4 are attached. The post-processing apparatus 3 performs a post-processing on a sheet on which an image is formed. The relay conveying unit 4 conveys the sheet on which the image is formed to the post-processing apparatus 3. The post-processing apparatus 3 may include a punching apparatus configured to perform a punching processing on the sheet and a staple apparatus configured to bind a sheet bundle. The description about the punching apparatus and the staple apparatus is omitted.

The printer main body 2 is provided with an image reading part 6 and an image forming part 7 arranged below the image reading part 6. Between the image reading part 6 and the image forming part 7, an in-body sheet ejection space 8 is formed opened on a front side and a left side. On a left side of the in-body sheet ejection space 8, the post processing apparatus 3 is attached. In the in-body sheet ejection space 8, the relay conveying unit 4 is installed.

In the lower part of the image forming part 7, three sheet feeding cassettes 11 each storing sheets are arranged in the vertical direction. A sheet feeding device 22 is provided above the left end of each sheet feeding cassette 11. Above the sheet feeding cassettes 11, a photosensitive drum 13 as an image carrier is rotatably provided. Around the photosensitive drum 11, a charger 14, a development device 15, a transferring roller 16 and cleaning device 17 are disposed in sequential order along a rotation direction of the photosensitive drum 11. Between the photosensitive drum 11 and the transferring roller 16, a transferring part 23 is formed. Above the development device 15, a toner container 18 is attached. Above the photosensitive drum 13, an exposure device 19 containing a laser scanning unit (LSU) is provided. On a left side of the exposure device 19, a fixing device 24 is provided. On a right side face of the in-body sheet ejection space 8, a sheet ejecting part 25 is formed. In the sheet ejecting part 25, an upper sheet ejecting port 25a and a lower sheet ejecting port 25b are formed arranged in the vertical direction.

In the image forming part 7, a sheet conveying path 21 is formed from the sheet feeding devices 22 to the sheet ejecting part 25 through the transferring part 23 and the fixing device 24.

Next, the operation of forming an image by the printer 1 having such a configuration will be described. After a surface of the photosensitive drum 13 is charged by the charger 14, the exposure device 19 exposes the surface of the photosensitive drum 13 with a laser light (refer to a two-dotted line p in FIG. 1) based on an image date to form an electrostatic latent image on the surface of the photosensitive drum 13. The electrostatic latent image is then developed into a toner image by the developing device 15 with toner supplied from the toner container 18.

On the other hand, the sheet fed from the sheet feeding cassette 11 by the corresponding sheet feeding device 22 is conveyed along the sheet conveying path 21 into the transferring part 23 in a suitable timing with the above image forming operation. At the transferring part 23, the toner image on the photosensitive drum 13 is transferred on the sheet. The sheet on which the toner image is transferred is conveyed on a downstream side along the sheet conveying path 21 and enters the fixing device 24 and then, the toner image is fixed on the sheet in the fixing device 24. The sheet with the fixed toner image is ejected from either of the upper sheet ejecting port 25a or the lower sheet ejecting port 25b of the sheet ejecting part 25. The toner remained on the photosensitive drum 13 is removed by the cleaning device 17.

Figure 2:
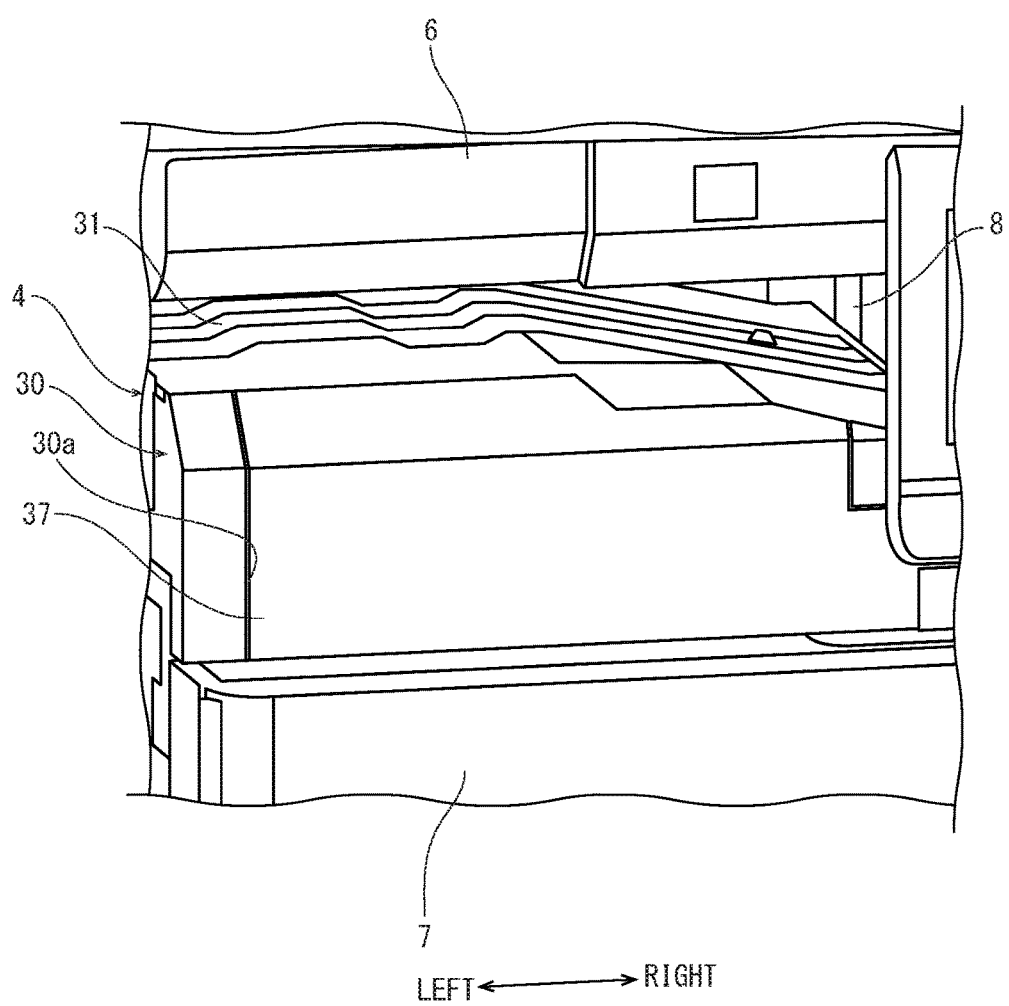
FIG. 2 is a perspective view showing a relay conveying unit according to an embodiment of the present disclosure.
Figure 3:
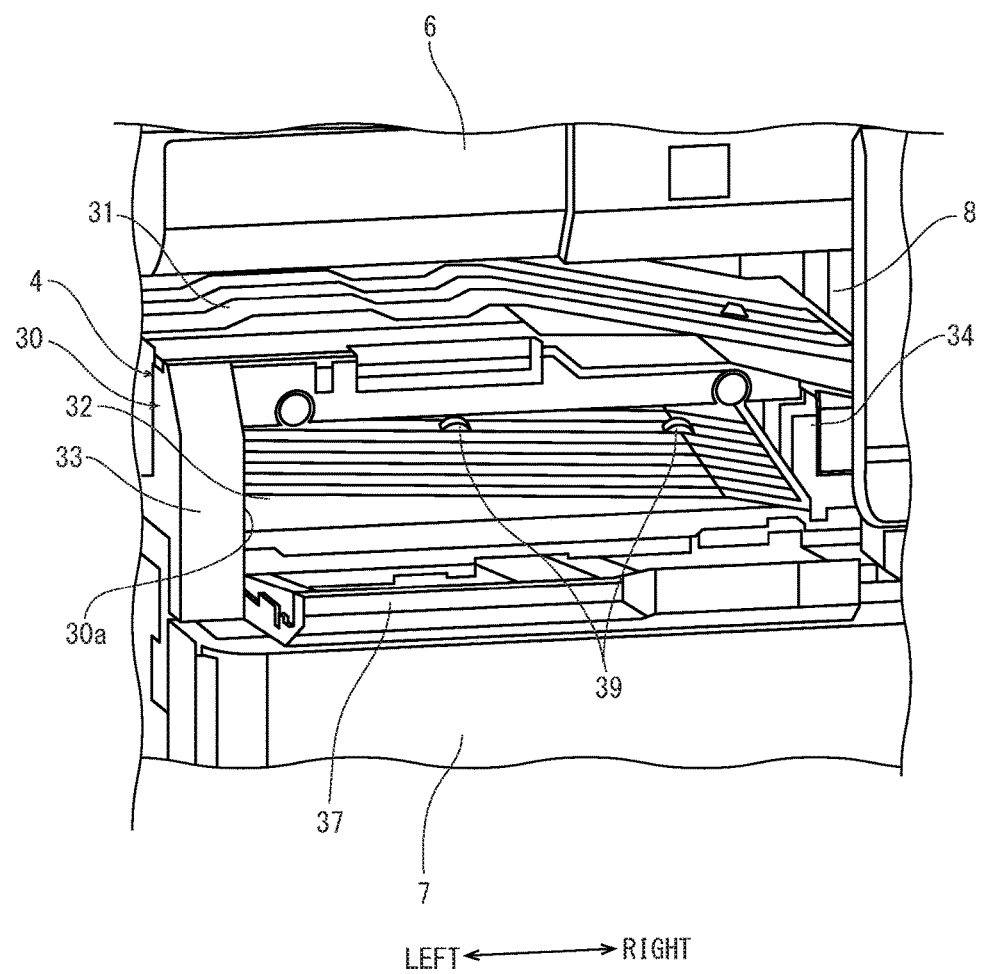
FIG. 3 is a perspective view showing a relay conveying path which is opened by turning a front cover, in the relay conveying unit according to the embodiment of the present disclosure.
Figure 4:
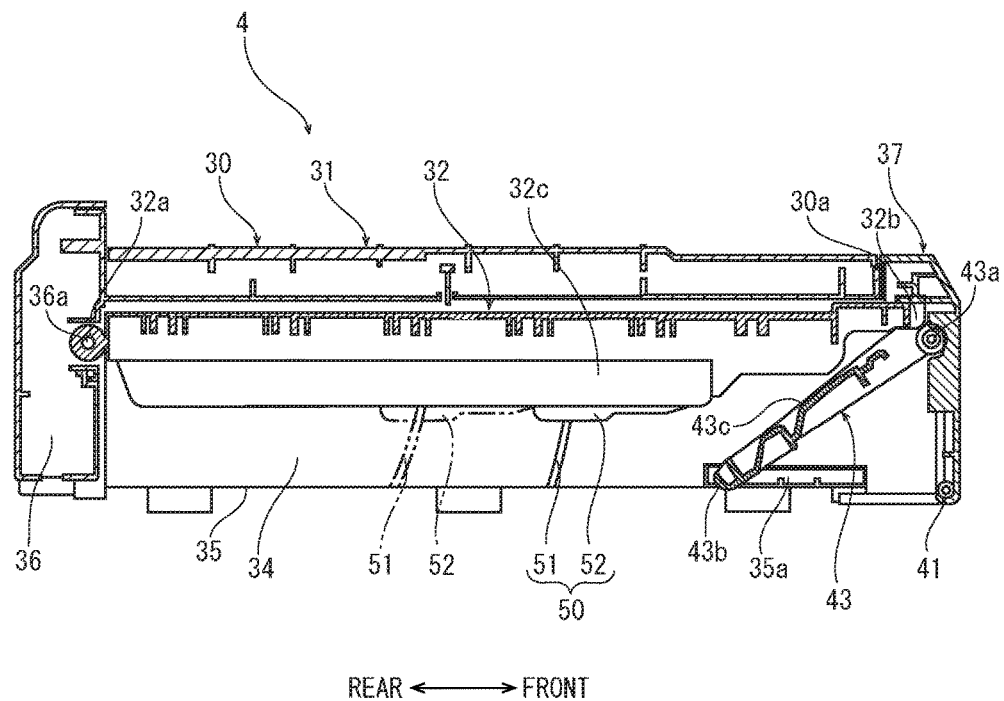
FIG. 4 is a sectional side view of the relay conveying unit according to the embodiment of the present disclosure.
Figure 5:
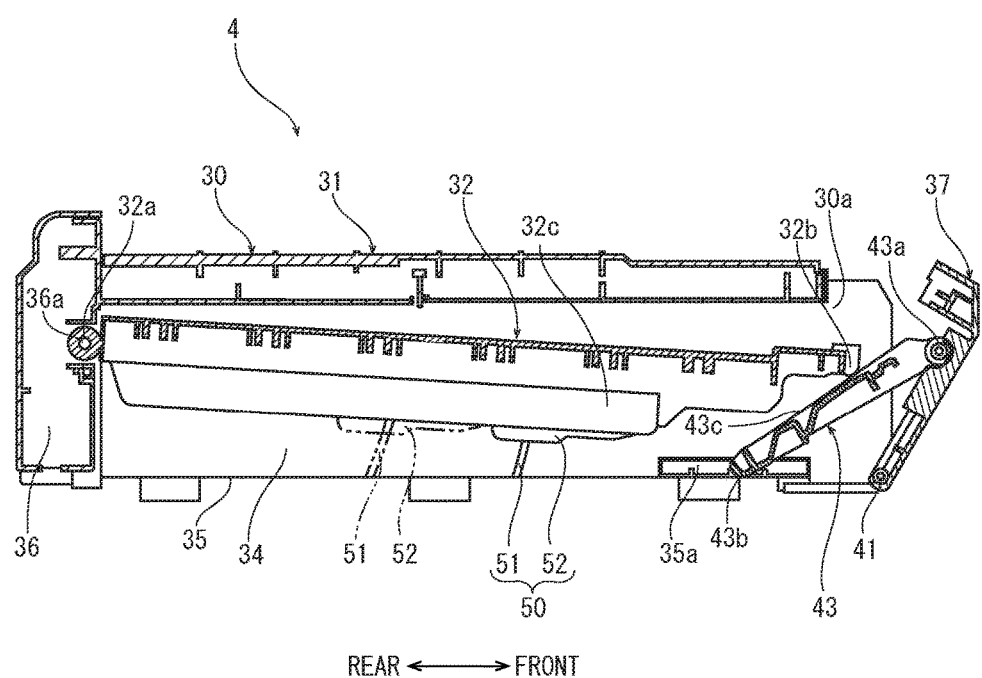
FIG. 5 is a sectional side view showing the relay conveying unit in which a lower conveying guide is turned downward by turning the front cover by an angle of 30 degrees, according to the embodiment of the present disclosure.
Figure 6:
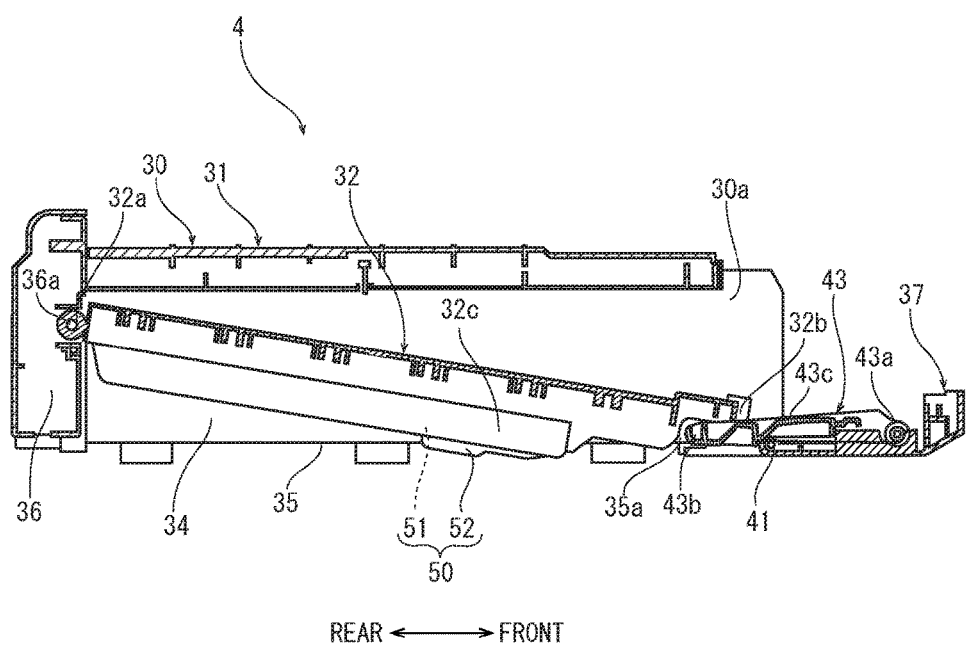
FIG. 6 is a sectional side view showing the relay conveying unit in which a relay conveying path is opened by turning the front cover, according to the embodiment of the present disclosure.

Next, the relay conveying unit 4 will be described with reference to FIG. 2 to FIG. 6. FIG. 2 is a perspective view showing the relay conveying unit in which a front cover is turned to forma relay conveying path; FIG. 3 is a perspective view showing the relay conveying unit in which the front cover is turned to open the relay conveying path; and FIG. 4 to FIG. 6 are sectional side views each showing an opening and closing of the relay conveying path with the turning of a lower conveying guide.

An apparatus main body 30 of the relay conveying unit 4 is a flat, substantially rectangular parallelepiped shape, and has an upper conveying guide 31 and a lower conveying guide 32 which are respectively disposed above and below, left and right side walls 33 and 34, a rear wall 36 and a bottom plate 35. The upper conveying guide 31 and the lower conveying guide 32 form or open a relay conveying path along which a sheet on which an image is formed at the image forming unit 7 is conveyed to the post-processing device 3. On a front surface of the apparatus main body 30, an opening 30a is formed. The opening 30a is opened or closed by a front cover 37 as a cover member provided to be turnable around its lower end.

An upper surface of the upper conveying guide 31 forms an ejected sheet tray on which sheets ejected from the upper sheet ejecting port 35a of the sheet ejecting part 25 are stacked. The upper surface inclines upward toward a downstream side in a sheet ejecting direction. A plurality of ribs are formed on the upper surface along the sheet ejecting direction. A lower surface of the upper conveying guide 31 forms an upper guiding surface of the relay conveying path. On the lower surface as well, a plurality of ribs are formed along the sheet ejecting direction.

An upper surface of the lower conveying guide 32 forms a lower guiding surface of the relay conveying path. On the upper surface, a plurality of ribs are formed along the sheet ejecting direction, and conveying rollers 39 are rotatably supported at predetermined intervals along the sheet ejecting direction. Also, from both of the left and right side edges of the lower conveying guide 32, extension pieces 32c (refer to FIG. 4 or the like) are respectively suspended along the inside surfaces of the left and right side walls 33 and 34 of the apparatus main body 30. The lower conveying guide 32 is formed with bearing holes 32a at its rear end. The bearing holes 32a are rotatably engaged with supporting shafts 36a provided on the rear wall 36 of the apparatus main body 30. The lower conveying guide 32 vertically turns around the supporting shaft 36a between a substantially horizontal upper position (refer to FIG. 4) and a lower position (refer to FIG. 6) inclined in a front lower direction. At the upper position, the upper guiding surface of the upper conveying guide 31 and the lower guiding surface of the lower conveying guide 32 oppose to each other at predetermined intervals to form the relay conveying path for sheet. At the lower position, the lower guiding surf ace is spaced downward from the upper guiding surface to open the relay conveying path.

On the right side wall 34, a sheet receiving port (not shown) configured to receive a sheet ejected from the lower sheet ejecting port 25b is formed. On the left side wall 33, a sheet delivering port (not shown) to deliver the sheet to the post-processing device 3 is formed. The sheet ejected from the lower sheet ejecting port 25b is received in the relay conveying path through the sheet receiving port, conveyed by the conveying roller 39 along the relay conveying path and then delivered from the delivery port to the post-processing device 3.

As shown in FIG. 4, the front cover 37 is formed with turning shafts 41 protruding in an opposite direction to each other at lower end portions of its left and right side surfaces. The turning shafts 41 are rotatably supported in bearing holes (not shown) formed at the lower end portions of the inside surfaces of the left and right side walls 33 and 34. In this manner, the front cover 37 turns vertically around the turning shafts 41 between a closed position at which the front opening 30a is closed and an open position at which the front opening 30a is opened.

In addition, the front cover 37, as shown in FIG. 4, is linked with the lower conveying guide 32 via a link arm 43. The link arm 43 is disposed between each of the left and right side edges of an inside surface the front cover 37 and the bottom plate 35 of the lower conveying guide 32. An upper end 43a of the link arm 43 is turnably supported at a slightly below position from each upper end of the left and right side edges of the inside surface of the front cover 37. A lower end 43b of the link arm 43 is slidably supported in the front and rear directions in a guiding groove 35a formed along each of the left and right side edges of the bottom plate 35. A front end of the lower conveying guide 32 is linked to be slidable along a rear surface 43c of the link arm 43.

In a state in which the front cover 37 is turned to close the opening 30a, shown in FIG. 4, the link arm 43 inclines at an angle of substantially 45 degrees, and the lower end 43b of the link arm 43 slides to a rear end of the guiding groove 35a. The lower conveying guide 32 turns into the upper position, and the front end 32b engages with the front cover 37. In this manner, the relay conveying path is formed between the lower conveying guide 32 and the upper conveying guide 31.

As shown in FIG. 5, if the front cover 37 is turned at an angle of 30 degrees, the upper end of the link arm 43 moves forward together with the front cover 37, and the lower end 43b of the link arm 43 moves forward along the guiding groove 35a and then gradually inclines forward. With this inclination of the link arm 43, the lower conveying guide 32 turns downward around the supporting shaft 36a, the front end 32b of the link arm 43 slides on the rear surface 43c of the link arm 43, and the relay conveying path starts to be opened.

As shown in FIG. 6, if the front cover 37 is tuned to open the opening 30a completely, the link arm 43 inclines into a substantially horizontal posture, and the front end 32b of the lower conveying guide 32 slides up to a lower end of the rear surface 43c of the link arm 43 and then the lower conveying guide 32 turns downward into an inclined posture at an angle of substantially 30 degrees to open the relay conveying path.

The lower conveying guide 32 is provided with a damper mechanism 50 configured to apply a load to the turning in the direction in which the relay conveying path is opened. The damper mechanism 50, as shown in FIG. 4, has: a rack 51 provided on each of the left and right side walls 33 and 34; and a damper unit 52 provided in the lower conveying guide 32 which is a turning member.

The rack 51 is formed on the inside surface of each of the left and right side walls 33 and 34 so as to be along an arc around the supporting shaft 36a of the lower conveying guide 32. On a front side face of the rack 51, rack teeth are formed.

Figure 7:
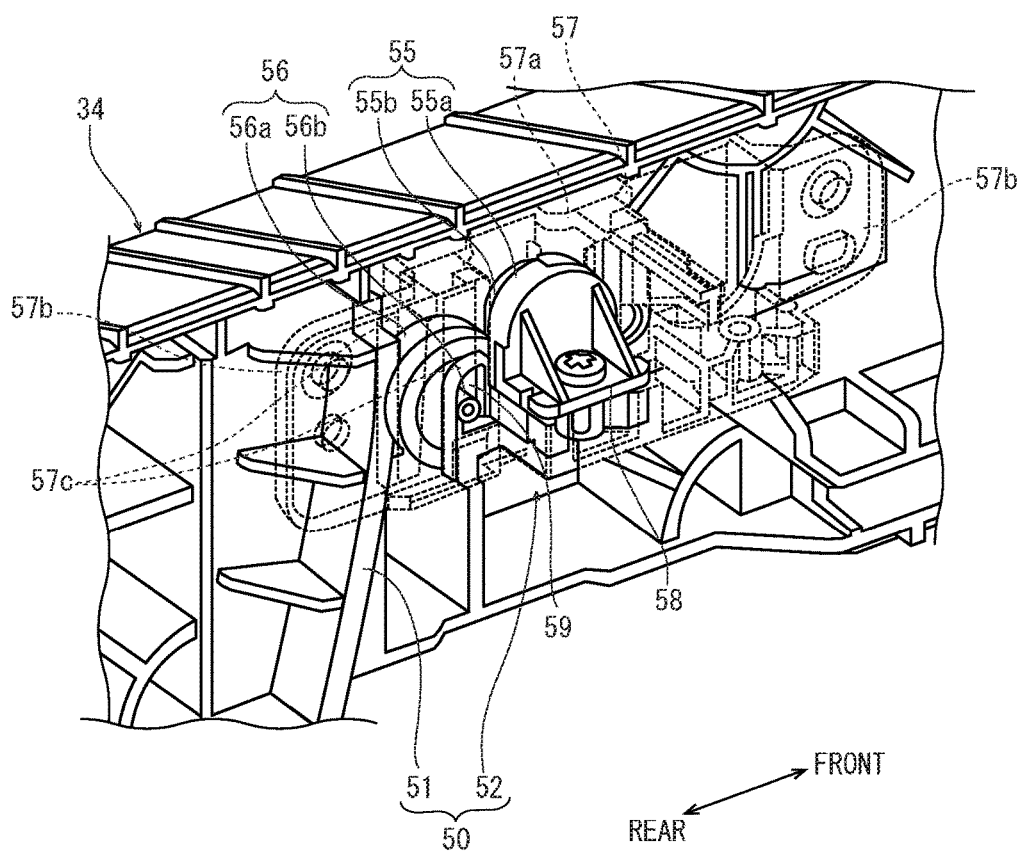
FIG. 7 is a perspective view showing a damper unit, in a damper mechanism of a turning member according to an embodiment of the present disclosure.
Figure 8:
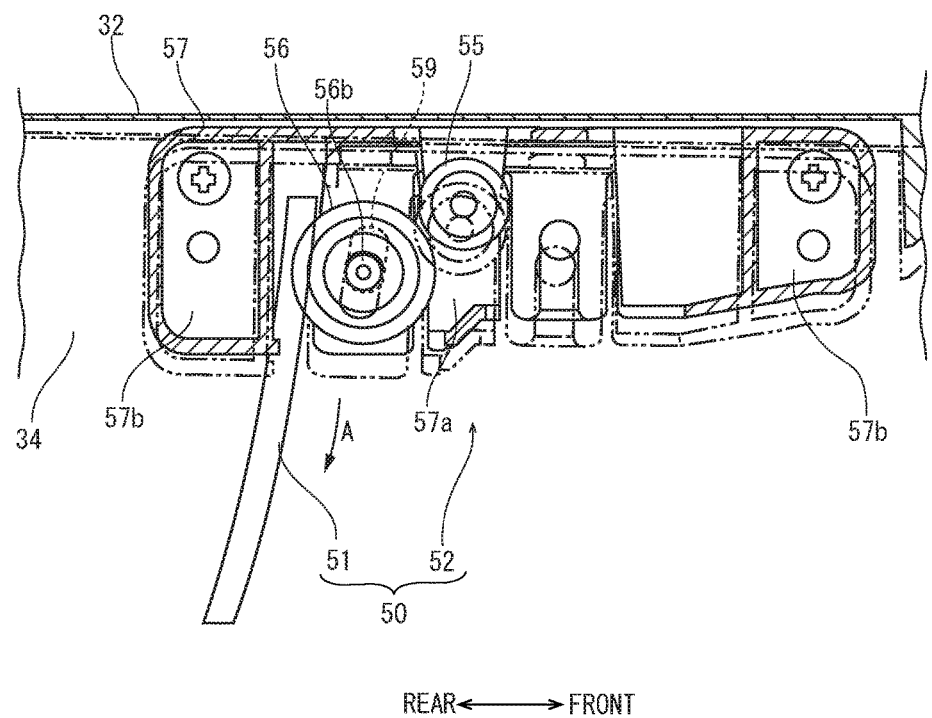
FIG. 8 is a front view showing the damper unit, in the damper mechanism of the turning member according to the embodiment of the present disclosure.

The damper unit 52 will be described with reference to FIG. 7 and FIG. 8. FIG. 7 is a perspective view of the damper unit; and FIG. 8 is a front view of the damper unit. The damper unit 52 includes a supporting member 57 mounted to the lower conveying guide 32, a fixed gear 55 having a damper function and a movable gear 56 which are supported by the supporting member 57.

The supporting member 57 has a recessed storage part 57a and attachment pieces 57b respectively extending outward from both sides of the storage part 57a. A pedestal 58 is formed near the center of the storage part 57a. On one side of the pedestal 58, a pair of supporting pieces 57c parallel to the attachment piece 57b are formed. In each supporting piece 57a, an elongated hole 59 along the turning direction of the lower conveying guide 32 around the supporting shaft 36a is formed. In each attachment piece 57b, a hole or a positioning hole through which a screw is to be inserted are formed.

As the fixed gear 55, a damper gear, such as a rotary damper, may be used. The fixed gear 55 has a main body part 55a and a gear part 55b. The main body part 55a is charged with viscous fluid, such as silicone oil. The gear part 55b is rotatably supported on the main body part 55a. If the gear part 55b rotates with respect to the main body 55a, a load is applied to the gear part 55b from the viscous fluid to damper the rotation of the gear part 55b. The fixedgear 55 is rotatably supported on the pedestal 58 of the storage part 57a.

The movable gear 56 has a gear part 56a and a rotating shaft 56b. The both ends of the rotating shaft 56b respectively engage with the elongated holes 59 formed in the supporting piece 57a so as to be slidable along the elongated hole 59. When the movable gear 56 slides along the elongated hole 59 in one direction (in the upper direction of FIG. 7 and FIG. 8), the movable gear 56 engages with the fixed gear 55. When the movable gear 56 slides along the elongated hole 59 in the other direction (in the lower direction of FIG. 7 and FIG. 8), the movable gear 56 is separated from the fixed gear 55. Thus, the movable gear 56 slides along the elongated hole 59 between a separate position to be separated from the fixed gear 55 and an engagement position to be engaged with the fixed gear 55.

The supporting member 57 is mounted to the lower conveying guide 32 by attaching the attachment pieces 57b to a lower end portion of the outside surface of the extension piece 32c of the lower conveying guide 21 such that the movable gear 56 engages with the teeth of the rack 51 provided on the inside surface of each of the left and right side walls 33 and 34. Here, as shown in FIG. 8, in a state in which the lower conveying guide 32 is turned into the upper position to form the relay conveying path, the movable gear 56 engaging with the rack 51 slides to a position close to the lower end of the elongated hole 59 of the supporting member 57 and then is separated downward from the fixed gear 55. By mounting the supporting member 57 to the lower conveying guide 32 in such a manner, if the lower conveying guide 32 turns around the supporting shaft 36a, the movable gear 56 rotates in engagement with the teeth of the rack 51.

Figure 9:
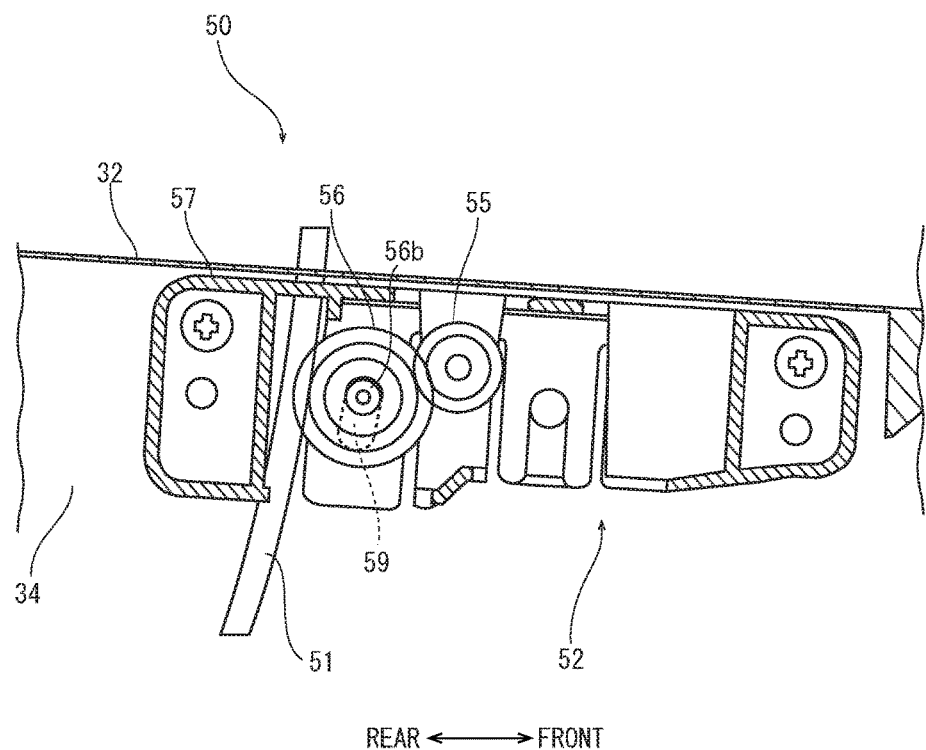
FIG. 9 is a front view showing the damper unit in a state in which the lower conveying guide is turned downward by turning the front cover by an angle of 30 degrees, in the relay conveying unit according to the embodiment of the present disclosure.
Figure 10:
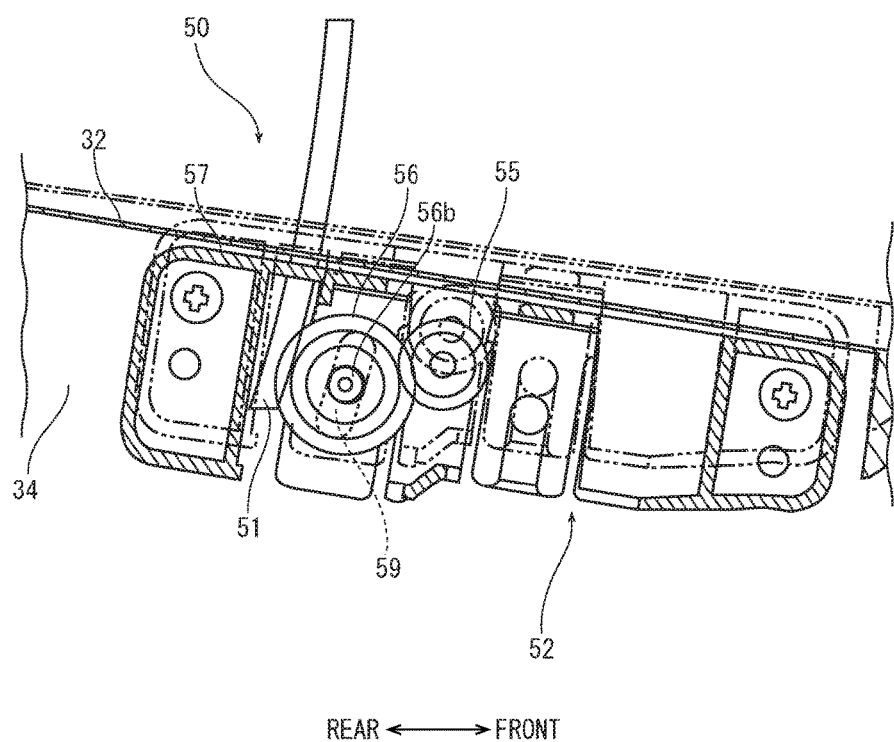
FIG. 10 is a front view showing the damper unit in a state in which the relay conveying path is opened by turning the front cover, in the relay conveying unit according to the embodiment of the present disclosure.

A damper work to buffer the turning of the lower conveying guide 32 by the damper mechanism 50 having the above construction will be described with reference to FIG. 8, FIGS. 9 to 10. FIG. 9 shows the damper unit in a state in which the lower conveying guide turns downward to turn the front cover at an angle of 30 degrees; and FIG. 10 shows the damper unit in which the lower conveying guide is turned into the lower position.

At the upper position of the lower conveying guide 32 shown in FIG. 8, the movable gear 56 of the damper mechanism 50 engages with the rack 51 at a position close to the lower end of the elongated hole 59, and is separated downward from the fixed gear 55. In a case where a sheet jam or the like occurs in the relay conveying path, if the front cover 37 is turned downward, the lower conveying guide 32 starts turning downward around the supporting shaft 36a via the link arm 43. Namely, the movable gear 56 is separated forward in the turning direction of the lower conveying guide 32 with respect to the fixed gear 55. If the lower conveying guide 32 turns downward, as indicated by the arrow A, the supporting member 57 also moves downward together with the lower conveying guide 32. Here, although the supporting member 57 moves downward together with the lower conveying guide 32, as indicated by the double-dotted chain line of FIG. 8, the movable gear 56 does not move from the position to be engaged with the rack 51. That is, the movable gear 56 moves upward along the elongated hole 59 relative to the supporting member 57. Due to this upward movement, the movable gear 56 engages with the fixed gear 55.

Further, if the front cover 37 is turned to turn the lower conveying guide 32 downward, the movable gear 56 engaging with the fixed gear 55 moves with the supporting member 57 while rotating in engagement with the rack 51. Since the movable gear 56 engages with the fixed gear 55, the movable gear 56 is applied with a load from the fixed gear 55 so that the rotation of the movable gear 55, that is, the movement of the movable gear 55 along the rack 51 is buffered. Namely, the downward turning of the lower conveying guide 32 is buffered, and the turning of the front cover 37 via the link arm 43 is indirectly buffered as well.

As shown in FIG. 9, on the way of the turning movement of the lower conveying guide 32 as well, the movable gear 56 always engages with the fixed gear 55. The lower conveying guide 32 turns into the lower position shown in FIG. 10 while receiving the load from the fixed gear 55. By turning the front cover 37 to turn the lower conveying guide 32 downward around the supporting shaft 36a, since the relay conveying path is opened, it becomes possible to easily handle the sheet jam.

In a case where the relay conveying path is closed after handling or the like of the sheet jam occurred in the relay conveying path, if the front cover 37 is turned upward, the lower conveying guide 32 starts turning upward around the supporting shaft 36a via the link arm 43. In this manner, the supporting member 57 also moves upward together with the lower conveying guide 32. Here, as indicated by the double-dotted chain line of FIG. 10, although the supporting member 57 moves upward, the movable gear 56 does not move from the position to be engaged with the rack 51. That is, the movable gear 56 moves downward along the elongated hole 59 with relative to the supporting member 57. Due to this downward movement, the movable gear 56 is separated from the fixed gear 55.

Further, if the front cover 37 is turned upward to turn the lower conveying guide 32 upward, the movable gear 56 moves downward along the elongated hole 59 with relative to the supporting member 57 and then the rotating shaft 56b of the movable gear 56 are lockedwith the lower ends of the elongated holes 59. In this manner, the movable gear 56 separated away from the fixed gear 55 moves with the supporting member 57 while rotating in engagement with the rack 51. During the lower conveying guide 32 turns upward, since the fixed gear 55 always precedes the movable gear 56, the movable gear 56 does not engage with the fixed gear 55 during the turning of the lower conveying guide 21 into the upper position 32.

As has been described above, in the damper mechanism 50 of the present disclosure, when the lower conveying guide 32 is turned into the lower position, the turning movement is buffered, thus making it possible to prevent sudden turning of the lower conveying guide 32, whereas when the lower conveying guide 32 is turned into the upper position, no load is applied to the lower conveying guide 32 and thus it becomes possible to easily turn the front cover 37 to close the opening 30a. In particular, in a case where the front cover 37 and the lower conveying guide 32 move together as in this embodiment, since the weight of the lower conveying guide 32 is also applied to the front cover 37, the front cover 37 may turn downward suddenly. However, in the embodiment, since the damper mechanism 50 is provided in the lower conveying guide 32 to buffer the downward turning of the lower conveying guide 32, it makes possible to impart a comfortability and a high grade sense to the turning movement of the front cover 37 to open the opening 30a.

In addition, since the movable gear 56 can be automatically made close to or separate from the fixed gear 55 by the turning movement of the front cover 37, there is no need to provide a member to move the movable gear 56, and thus an increase in the number of parts can be restrained.

In addition, in the embodiment, since the damper mechanism 50 is provided in the lower conveying guide 32, the damper mechanism 50 can be disposed at a position spaced from the supporting shaft 36a. Accordingly, even if a rotary damper of small load is used as the fixed gear 55, a high damper effect can be exhibited. Therefore, as the fixed gear 55, an inexpensive, small-sized damper gear can be used, thus enabling downsizing of the damper unit 52 and cost reduction. Incidentally, although the damper mechanism 50 may be provided to the front cover 37, in this case, the damper mechanism 50 is disposed at the position close to the turning shaft 41 of the front cover 37, thus making it necessary to increase a load applied to the movable gear 56. Namely, there is a need to use a fixed gear having a high damper function, thus leading to higher costs.

Further, in the damper mechanism 50 of the embodiment, a load applied to the lower conveying guide 32 can be easily adjusted. A method of adjusting the load applied to the lower conveying guide 32 will be described with reference to FIG. 11.

Figure 11:
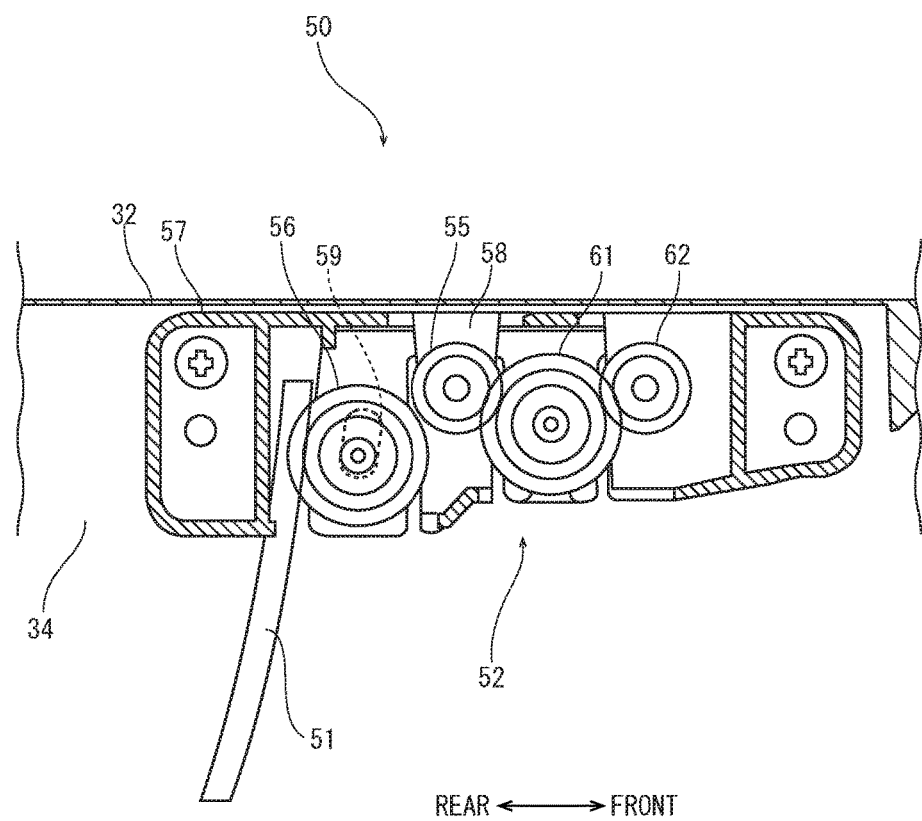
FIG. 11 is a front view showing another example of the damper unit, in the damper mechanism of the turning member according to the embodiment of the present disclosure.

In order to increase the load applied to the lower conveying guide 32, as shown in FIG. 11, a second fixed gear 62 is serially engaged with the fixed gear 55 via an idle gear 61. As the second fixed gear 62 as well, a damper gear can be used. By increasing the number of fixed gears in this manner, the load applied to the movable gear 56 can be thereby increased, thus making it possible to enhance the damper effect on the turning of the lower conveying guide 32.

In addition, since the damper unit 52 is provided to be attachable to or detachable from the lower conveying guide 32, in a case where the load applied to the lower conveying guide 32 is reduced, the damper unit 52 is attached to the extension piece 32c of the lower conveying guide 32 at the position close to the supporting shaft 36a. Then, as indicated by the double-dotted chain line of FIG. 4, another rack 51 is formed on each of the left and right side walls 33 and 34 so as to engage with the movable gear 56 of the damper unit 52. In this case, since the load applied to the supporting shaft 36a is reduced, the damper work on the turning of the lower conveying guide 32 becomes weakened, and the turning velocity of the lower conveying guide 32 increases. Thus, by forming the racks 51 at a plurality of portions and providing the damper unit 52 attachably/detachably so as to be able to engage with each of the racks 51, a distance between the damper unit 52 and the supporting shaft 36a can be varied, and a force to buffer the turning of the lowering conveying guide 32 can be adjusted.

The damper unit 52 is thus downsized to be attachable to or detachable from the lower conveying guide 32, whereby the position of the damper unit 52 is adjusted easily and the load applied to the lower conveying guide 32 can be easily adjusted.

Further, although the embodiment of the present disclosure is described as to a case in which the damper mechanism 50 is applied to the lower conveying guide 32 of the relay conveying unit 4, this damper mechanism 50 can also be applied to a cover to open or close the image forming part 7 of the printer 1, another cover to open the conveying path 21 or the like. In addition, the damper mechanism 50 can be applied to a turning member to turn around its upper end or a turning member to turn around its left side end or right side end. In particular, the damper mechanism. 50 of the present disclosure is effective in a case where a turning member is turned downward owing to its gravity. In addition, although in the embodiment of the present disclosure, the rack 51 is provided on each of the left and right side walls 33 and 34 of the apparatus main body 30, whereas the damper unit 52 is provided in the lower conveying guide 32 that is a turning member, it is also possible to provide the rack 51 in the lower conveying guide 32 and to provide the damper unit 52 on each of the left and right side walls 33 and 34. However, it is preferable to provide the rack 51 on each of the left and right side walls 33 and 34 and to provide the damper unit 52 in the lower conveying guide 32 that is the turning member because of simple construction and space saving.

While the preferable embodiment and its modified example of the sheet feeding device and the image forming apparatus of the present disclosure have been described above and various technically preferable configurations have been illustrated, a technical range of the disclosure is not to be restricted by the description and illustration of the embodiment.

Further, the components in the embodiment of the disclosure may be suitably replaced with other components, or variously combined with the other components. The claims are not restricted by the description of the embodiment of the disclosure as mentioned above.

What is claimed is:

1. A damper mechanism of a turning member which is provided in an apparatus main body so as to be turnable between a first position and a second position around at least one supporting shaft, the damper mechanism comprising:

at least one rack provided in either one of the apparatus main body and the turning member and formed along an arch around the supporting shaft; and a damper unit provided in the other of the apparatus main body and the turning member, wherein the damper unit includes:
a movable gear configured to engage with the at least one rack and to rotate by the turning of the turning member;
a fixed gear configured to be capable of engaging with the movable gear and to apply a load to the rotation of the movable gear; and
a supporting member configured to support the fixed gear and the movable gear, the movable gear being supported so as to move relatively with respect to the fixed gear in a direction to be engaged with the fixed gear at the turning of the turning member in one direction from the first position to the second position and in another direction to be separated from the fixed gear at the turning of the turning member in the other direction from the second position to the first position, wherein the supporting member has an elongated hole which is formed along the turning direction of the turning member and is configured to support the movable gear so as to be movable between a separate position to be separated from the fixed gear and an engagement position to be capable of engaging with the fixed gear, and the movable gear is moved in the elongated hole from the separate position to the engagement position relative to the fixed gear by the turning of the turning member in the one direction to apply a load from the fixed gear to the turning member and is moved in the elongated hole from the engagement position to the separate position relative to the fixed gear by the turning of the turning member in the other direction to release the load from the fixed gear to the turning member.

2. The damper mechanism of the turning member, according to claim 1,
wherein the movable gear is separated forward from the fixed gear in the one direction at the separate position.

3. The damper mechanism of the turning member, according to claim 1,
wherein the first position is an upper position at which the turning member turns in an upper direction around the supporting shaft, and
the second position is a lower position at which the turning member turns in a lower direction around the supporting shaft.

4. The damper mechanism of the turning member, according to claim 1,
wherein the damper unit is provided in the turning member and the at least one rack is provided in the apparatus main body.

5. The damper mechanism of the turning member, according to claim 1,
wherein the at least one rack includes a plurality of racks,
the plurality of racks are respectively provided at a plurality of positions at which distances from the supporting shaft are different from each other, and
the damper unit is provided to be attachable to or detachable from a position at which the movable gear engages with either one of the plurality of the racks.

6. The damper mechanism of the turning member, according to claim 1, wherein the damper unit has another fixed damper gear capable of engaging with the fixed gear.

7. The damper mechanism of the turning member, according to claim 1,
wherein the apparatus main body is provided with the at least one supporting shaft and the turning member is provided with a bearing hole with which the supporting shaft is rotatably engaged.

8. A relay conveying unit disposed in an in-body sheet ejection space of an image forming apparatus and including a relay conveying path along which a sheet being formed an image is conveyed to a post-processing device, the relay conveying unit comprising:
an apparatus main body in which the relay conveying path is provided;
an upper conveying guide provided in the apparatus main body and forming an upper guiding surface of the relay conveying path;
a lower conveying guide forming a lower guiding surface of the relay conveying path, the lower conveying guide being supported in the apparatus main body so as to be turnable in a vertical direction around its one end to form or open the relay conveying path; and
the damper mechanism according to claim 1,
wherein the turning member is the lower conveying guide.

9. The relay conveying unit according to claim 8,
wherein the apparatus main body is formed with an opening on a side face and includes:
a cover member supported to be turnable around its lower end to open or close the opening; and
a link arm configured to link the covering member and the lower conveying guide with each other, and
the link arm turns the lower conveying guide in the one direction from the first position to the second position with the turning of the cover member in an open direction in which the opening is opened and turns the lower conveying guide in the other direction from the second position to the first position with the turning of the cover member in a closed direction in which the opening is closed.

10. An image forming apparatus comprising an image forming unit, a turning member and the damper mechanism configured to buffer the turning of the turning member, according to claim 1.

* * * * *